(12) United States Patent
Kindaichi et al.

(10) Patent No.: US 9,592,855 B2
(45) Date of Patent: Mar. 14, 2017

(54) VEHICLE-BODY LOWER STRUCTURE WITH SIDE COLLISION SENSOR

(71) Applicant: TOYOTA JIDOSHA KABUSHIKI KAISHA, Toyota-shi, Aichi-ken (JP)

(72) Inventors: Tetsumasa Kindaichi, Nisshin (JP); Kento Shigeishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/648,043

(22) PCT Filed: Nov. 30, 2012

(86) PCT No.: PCT/JP2012/081195
§ 371 (c)(1),
(2) Date: May 28, 2015

(87) PCT Pub. No.: WO2014/083704
PCT Pub. Date: Jun. 5, 2014

(65) Prior Publication Data
US 2015/0314809 A1    Nov. 5, 2015

(51) Int. Cl.
*B62D 25/02* (2006.01)
*B62D 21/15* (2006.01)
*B60R 21/0136* (2006.01)

(52) U.S. Cl.
CPC ........ *B62D 25/025* (2013.01); *B60R 21/0136* (2013.01); *B62D 21/157* (2013.01)

(58) Field of Classification Search
CPC .. B62D 25/025; B62D 21/157; B60R 21/0136
(Continued)

(56) References Cited

U.S. PATENT DOCUMENTS 7,753,419 B2 * 7/2010 Kondo ................... B60R 19/483
                                                                180/274
7,884,704 B2 * 2/2011 Iwano .................... B60J 5/0427
                                                                340/435
(Continued)

FOREIGN PATENT DOCUMENTS

JP    2001-055171 A    2/2001
JP    2003-291858 A    10/2003
(Continued)

*Primary Examiner* — Joseph D Pape
*Assistant Examiner* — Dana Ivey
(74) *Attorney, Agent, or Firm* — Oliff PLC

(57) ABSTRACT

Provided is a vehicle-body lower structure with a side collision sensor which vehicle-body lower structure can attain early sensing by improving a body structure. A first load transmission member of which a longitudinal section has a generally Z-shape is disposed in a closed section of a rocker. A first joining portion of first load transmission member is joined in a state where first joining portion is sandwiched between an upper flange of a rocker outer panel and an upper flange of a rocker inner panel, and a second joining portion is joined to an intermediate part, in a height direction, of a vertical wall portion of rocker outer panel. A body portion connects first joining portion and second joining portion diagonally, and transmits a load input into rocker outer panel at time of a side collision, to an upper-wall-portion side of rocker inner panel by a shortest distance.

10 Claims, 6 Drawing Sheets

(58) Field of Classification Search
USPC .................................................. 296/187.12
See application file for complete search history.

(56) References Cited

U.S. PATENT DOCUMENTS

2003/0184126 A1  10/2003  Yamazaki et al.
2009/0033476 A1   2/2009  Iwano et al.

FOREIGN PATENT DOCUMENTS

| JP | 3775171 B2    | 5/2006  |
| JP | 2008-120179 A | 5/2008  |
| JP | 2008-254702 A | 10/2008 |
| JP | 4186967 B2    | 11/2008 |

* cited by examiner

VEHICLE-BODY LOWER STRUCTURE WITH SIDE COLLISION SENSOR

TECHNICAL FIELD

The present invention relates to a vehicle-body lower structure with a side collision sensor.

BACKGROUND ART

Patent Document 1 describes a technique in which a load transmission member projecting by a predetermined length in a vehicle width direction is provided in at least one of an outer side of a rocker outer panel in the vehicle width direction and an inner side of a rocker molding in the vehicle width direction, both of which correspond to a lateral part of a sitting occupant. According to the conventional technique, at the time of a side collision, a collision object abuts with the load transmission member before the collision object abuts with the rocker outer panel, so that an impact load can be transmitted to a side collision sensor more quickly.

Patent Document 1: Japanese Patent No. 4186967

SUMMARY OF THE INVENTION

Problem to be Solved by the Invention

In the conventional technique, at the time of a side collision (particularly, a collision with a pole), although the load transmission member additionally provided between the rocker outer panel and the rocker molding makes it advantageously possible to quickly transmit a load to the rocker outer panel, a sectional deformation of a rocker itself is not considered. Accordingly, due to the influence of sectional deformation of the rocker itself, load transmission to an acceleration sensor (G sensor) disposed in a peripheral part of the rocker or a pillar lower part becomes slow. In view of this, there is room for improvement in the conventional technique from the viewpoint of early sensing.

Note that there is a technique to attain early sensing by improving a sensing logic of a control device, but there is a limit in the technique in which early sensing is attained by improving the sensing logic.

The present invention is achieved in consideration of the above fact, and intended to provide a vehicle-body lower structure with a side collision sensor which vehicle-body lower structure can attain early sensing by improving a body structure.

Means for Solving the Problem

A vehicle-body lower structure with a side collision sensor, according to a first aspect, includes: a rocker placed at an outer side of a vehicle-body lower portion in a vehicle width direction so as to extend along a vehicle front-rear direction, the rocker having a closed-section structure constituted by a rocker outer panel and a rocker inner panel such that an upper flange formed in an upper part of the rocker outer panel is joined to an upper flange formed in an upper part of the rocker inner panel; a side collision detection sensor attached to the rocker inner panel or a member joined to the rocker inner panel, or a lower part of a pillar provided in a standing manner from the rocker, so as to detect a side collision based on an acceleration; and a first load transmission member placed in a closed section of the rocker so as to partition the closed section longitudinally, the first load transmission member being configured such that a first joining portion thereof is joined in a state where the first joining portion is sandwiched between the upper flange of the rocker inner panel or the lower part of the pillar and the upper flange of the rocker outer panel and a second joining portion thereof is joined to a vertical wall portion placed at an outer side of the rocker outer panel in the vehicle width direction.

A vehicle-body lower structure with a side collision sensor, according to a second aspect, is configured such that: in the first aspect, the first joining portion is joined to the upper flange of the rocker outer panel in advance, and the second joining portion is joined to the vertical wall portion of the rocker outer panel in advance.

A vehicle-body lower structure with a side collision sensor, according to a third aspect, is configured such that: in the first or second aspect, the first load transmission member includes one or more ribbed portions formed between the first joining portion and the second joining portion and having a first edge line extending in the vehicle width direction.

A vehicle-body lower structure with a side collision sensor, according to a fourth aspect, is configured such that: in the third aspect, the first edge line and the side collision detection sensor are arranged side by side in the vehicle width direction in a vehicle plan view.

A vehicle-body lower structure with a side collision sensor, according to a fifth aspect, is configured such that: in any one of the first to fourth aspects, the side collision detection sensor is attached to a mounting bracket fixed in a state where the mounting bracket is provided over the upper wall portion of the rocker inner panel and a floor panel having an end joined to the upper wall portion.

A vehicle-body lower structure with a side collision sensor, according to a sixth aspect, is configured such that: in any of the first to fifth aspects, a second load transmission member overhanging outwardly in the vehicle width direction is provided at a position overlapping with the first load transmission member in a vehicle side view on an outer surface, in the vehicle width direction, of the vertical wall portion of the rocker outer panel.

A vehicle-body lower structure with a side collision sensor, according to a seventh aspect, is configured such that: in the sixth aspect, the second load transmission member includes one or more ribbed portions having a second edge line extending in the vehicle width direction along an extended direction of the first edge line.

A vehicle-body lower structure with a side collision sensor, according to an eighth aspect, is configured such that: in any of the first to seventh aspects, respective lower flanges are formed in a lower part of the rocker outer panel and a lower part of the rocker inner panel and the respective lower flanges are joined to each other; and the first load transmission member includes a third joining portion joined in a state where the third joining portion is sandwiched between the lower flange of the rocker inner panel or the lower part of the pillar and the lower flange of the rocker outer panel.

A vehicle-body lower structure with a side collision sensor, according to a ninth aspect, is configured such that: in the eighth aspect, the third joining portion is joined to the lower flange of the rocker outer panel in advance.

A vehicle-body lower structure with a side collision sensor, according to a tenth aspect, is configured such that: in the eighth or ninth aspect, the side collision detection sensor is attached to a vertical wall portion placed at an inner side of the rocker inner panel in the vehicle width direction.

An operation of the first aspect is as follows. A collision load at the time of a side collision is input to the rocker placed at the outer side of the vehicle-body lower portion in the vehicle width direction and extended along the vehicle front-rear direction. Since the rocker has a closed-section structure constituted by the rocker inner panel and the rocker outer panel, the collision load is input into the rocker outer panel, and then transmitted to the rocker inner panel. As a result, the collision load is transmitted from the rocker inner panel to the side collision detection sensor attached to the rocker inner panel or the like. Hereby, the side collision is detected.

Here, in the present aspect, the first load transmission member is placed inside the closed section of the rocker so as to partition the closed section longitudinally. Further, the first joining portion of the first load transmission member is joined in a state where the first joining portion is sandwiched between the upper flange of the rocker inner panel or the lower part of the pillar and the upper flange of the rocker outer panel, and the second joining portion is joined to the vertical wall portion placed at the outer side of the rocker outer panel in the vehicle width direction. In view of this, a load input into the vertical wall portion of the rocker outer panel is directly transmitted to the upper flange of the rocker inner panel or the lower part of the pillar through the first load transmission member. As a result, sensing by the side collision detection sensor is performed earlier. Note that, in addition to conventional load transmission passages, a load transmission passage through the first load transmission member is added as a load transmission passage from the rocker outer panel to the rocker inner panel, which also contributes to early sensing.

According to the second aspect, the first joining portion of the first load transmission member is joined to the upper flange of the rocker outer panel in advance, and the second joining portion is joined to the vertical wall portion of the rocker outer panel in advance. Accordingly, the first load transmission member is sub-assembled to the rocker outer panel. This makes it possible to easily perform assembly of the rocker.

According to the third aspect, the first load transmission member includes one or more ribbed portions formed between the first joining portion and the second joining portion and having an edge line extending in the vehicle width direction. Accordingly, rigidity to a load input in the vehicle width direction is increased. On this account, a collision load input into the second joining portion from the vertical wall portion of the rocker outer panel is efficiently transmitted to the first joining portion through the first edge line formed in the ribbed portion.

According to the fourth aspect, the first edge line and the side collision detection sensor are arranged side by side in the vehicle width direction in a vehicle plan view. Accordingly, the load transmission passage in a vehicle plan view is shortened.

According to the fifth aspect, the mounting bracket is fixed in a state where the mounting bracket is provided over the upper wall portion of the rocker inner panel and the floor panel, and the side collision detection sensor is attached to the mounting bracket. Accordingly, when a collision load is input into the vertical wall portion of the rocker outer panel at the time of a side collision, a rotation moment toward a direction where the first load transmission member pivots inwardly in the vehicle width direction with the first joining portion being taken as a rotation center is applied to the first load transmission member. As a result, the upper wall portion of the rocker inner panel is pushed up to a vehicle upper side, so that the side collision detection sensor can detect a side collision state more quickly.

According to the sixth aspect, the second load transmission member is provided at a position overlapping with the first load transmission member in a vehicle side view on the outer surface, in the vehicle width direction, of the vertical wall portion of the rocker outer panel so that the second load transmission member overhangs outwardly in the vehicle width direction. Accordingly, a collision load at the time of a side collision is input into the second load transmission member first. That is, at an earlier timing than a timing at which the collision load is input into the first load transmission member, the collision load is input into the second load transmission member. The collision load input into the second load transmission member is then transmitted to the first load transmission member from the vertical wall portion of the rocker outer panel. After that, the collision load is transmitted to the rocker inner panel so as to be input into the side collision detection sensor.

According to the seventh aspect, the second edge line of the ribbed portion formed in the second load transmission member is formed along the extended direction of the first edge line of the ribbed portion formed in the first load transmission member. This allows the collision load to be transmitted between the second edge line and the first edge line, which both have high load transmission performance. Accordingly, a transmission loss of the load can be reduced.

According to the eighth aspect, the first load transmission member includes the third joining portion as well as the first joining portion and the second joining portion. The third joining portion is joined in a state where the third joining portion is sandwiched between the lower flange of the rocker inner panel or the lower part of the pillar and the lower flange of the rocker outer panel. On this account, a collision load input into the vertical wall portion of the rocker outer panel is transmitted to the first joining portion and the third joining portion from the second joining portion of the first load transmission member. That is, the rotation moment is not applied to the first load transmission member, and the whole first load transmission member is displaced so as to move in parallel toward an inner side in the vehicle width direction. As a result, a disposition place of the side collision detection sensor is not limited.

According to the ninth aspect, the third joining portion of the first load transmission member is joined to the lower flange of the rocker outer panel in advance. Accordingly, the first load transmission member is sub-assembled to the rocker outer panel. This makes it possible to easily perform assembly of the rocker.

According to the tenth aspect, the side collision detection sensor is attached to the vertical wall portion placed at the inner side of the rocker inner panel in the vehicle width direction. This is suitable for the eighth aspect. That is, in a case where the side collision detection sensor is disposed on the vertical wall portion of the rocker inner panel, the load transmission passage becomes longer as compared with a case where the side collision detection sensor is disposed on an upper-wall-portion side of the rocker inner panel. However, in the present aspect, a collision load is also transmitted to the side collision detection sensor from the lower wall portion of the rocker inner panel, so that sensing by the side collision detection sensor is performed quickly.

Advantageous Effects of Invention

As described above, the vehicle-body lower structure with a side collision sensor, according to the first aspect, has an excellent effect of attaining early sensing by improving a body structure.

The vehicle-body lower structure with a side collision sensor, according to the second aspect, has an excellent effect of successfully maintaining productivity of the vehicle-body lower portion, eventually, a whole vehicle body.

The vehicle-body lower structure with a side collision sensor, according to the third aspect, has an excellent effect of further improving load transmission performance of the side collision detection sensor.

The vehicle-body lower structure with a side collision sensor, according to the fourth aspect, has an excellent effect of further shortening a detection time of the side collision detection sensor.

The vehicle-body lower structure with a side collision sensor, according to the fifth aspect, has an excellent effect of advancing a detection time particularly in a case where the side collision detection sensor is an acceleration sensor.

The vehicle-body lower structure with a side collision sensor, according to the sixth aspect, has an excellent effect of further attaining early sensing.

The vehicle-body lower structure with a side collision sensor, according to the seventh aspect, has an excellent effect of effectively improving the load transmission performance of the side collision detection sensor in cooperation with the first load transmission member.

The vehicle-body lower structure with a side collision sensor, according to the eighth aspect, has an excellent effect of increasing a degree of freedom in placement of the side collision detection sensor, so that the vehicle-body lower structure with a side collision sensor can be applied to more types of vehicles.

The vehicle-body lower structure with a side collision sensor, according to the ninth aspect, has an excellent effect of successfully maintaining productivity of the vehicle-body lower portion, eventually, a whole vehicle body.

The vehicle-body lower structure with a side collision sensor, according to the tenth aspect, has an excellent effect of attaining early sensing particularly in a case where the outer end of the floor panel in the vehicle width direction is joined to the vertical wall portion of the rocker inner panel.

MODES FOR CARRYING OUT THE INVENTION

First Embodiment

With reference to FIG. 1 to FIG. 5, the following describes the first embodiment of a vehicle-body lower structure with a side collision sensor according to the present invention. Note that an arrow FR shown appropriately in each figure indicates a vehicle front side, an arrow UP indicates a vehicle upper side, and an arrow IN indicates an inner side in a vehicle width direction.

Figure 5:
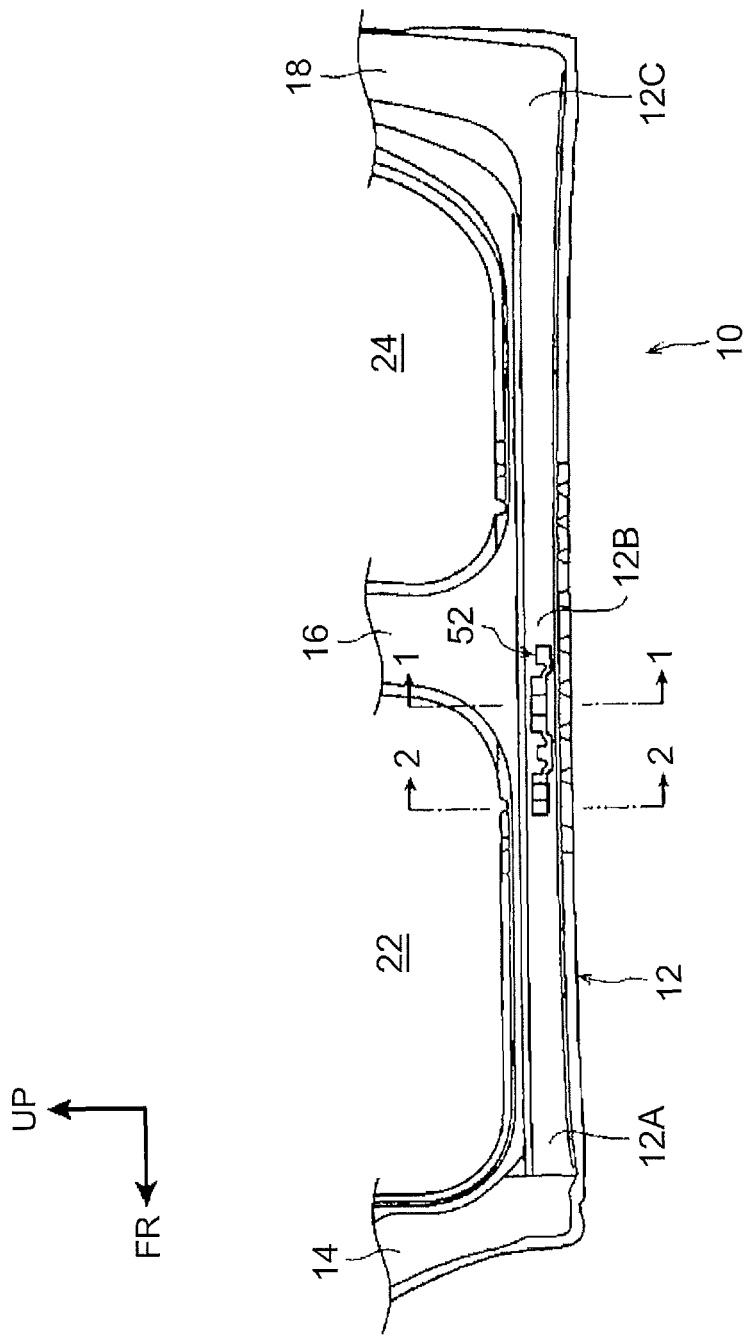
FIG. 5 is a side view illustrating a rocker to which the vehicle-body lower structure with a side collision sensor according to the first embodiment is applied, when viewed from an outer side in a vehicle width direction.

As illustrated in FIG. 5, a rocker 12 of which a longitudinal direction is along a vehicle front-rear direction is disposed on either end, in the vehicle width direction, of a vehicle-body lower portion 10. A lower part of a front pillar 14 is connected to a front end 12A of the rocker 12. Further, a lower part of a center pillar 16 is connected to an intermediate part 12B of the rocker 12 in its longitudinal direction. Further, a lower part of a rear pillar 18 is connected to a rear end 12C of the rocker 12. A front door opening 22 to be opened and closed by a front side door 20 (see FIG. 1) and to be used for getting on and off from a front seat is formed between the front pillar 14 and the center pillar 16. Similarly, a rear door opening 24 to be opened and closed by a rear side door (not shown) and to be used for getting on and off from a rear seat is formed between the center pillar 16 and the rear pillar 18.

Next will be described structures of the rocker 12 and the center pillar 16 with reference to FIG. 1 to FIG. 3. The rocker 12 has a closed-section structure (a structure in which a closed section 30 is formed on an inner side of the section) constituted by a rocker outer panel 26 placed at an outer side in the vehicle width direction and having a hat-shaped longitudinal section, and a rocker inner panel 28 placed at an inner side of the rocker outer panel 26 in the vehicle width direction and having a hat-shaped longitudinal section.

Figure 2:
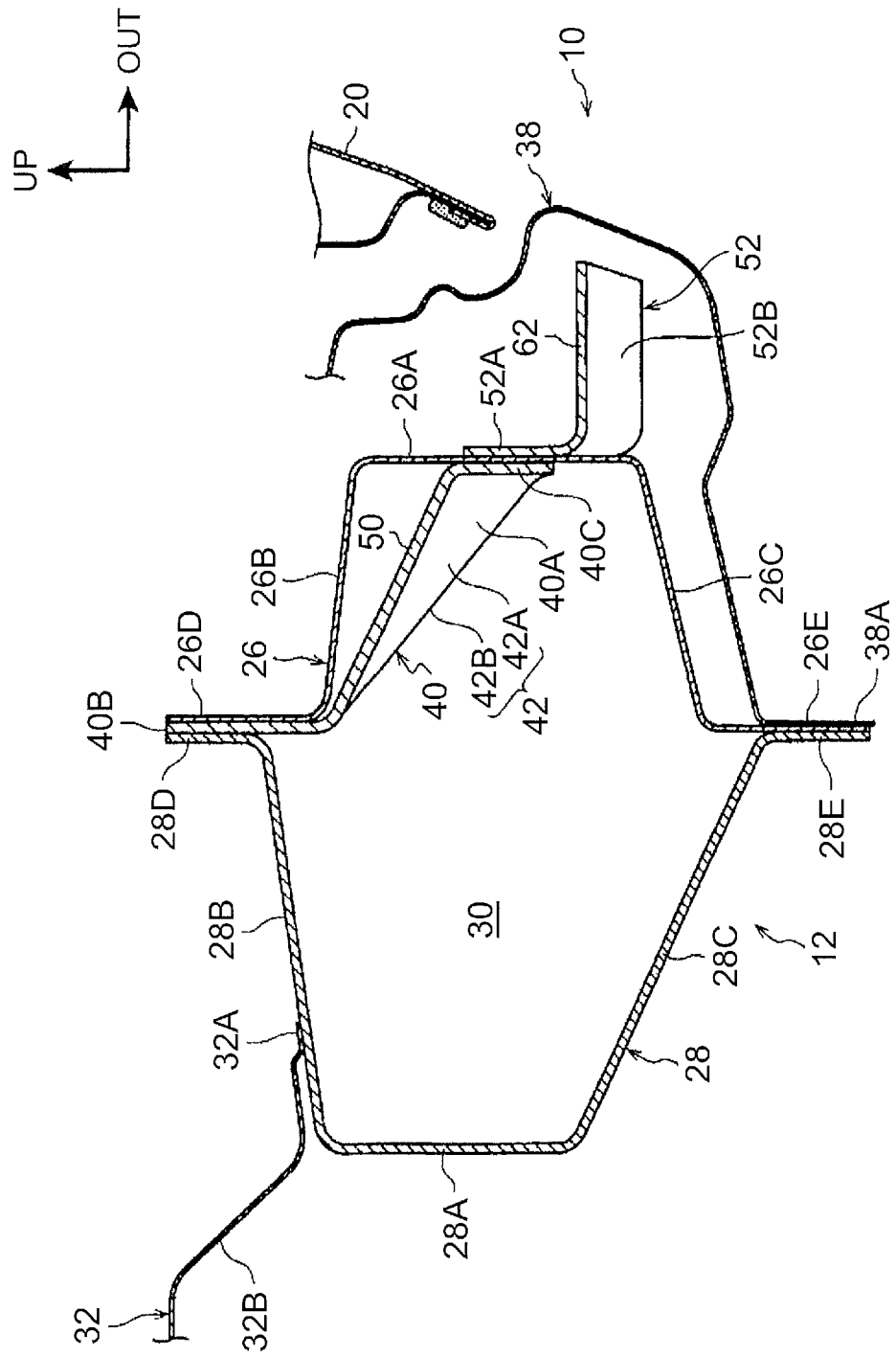
FIG. 2 is an enlarged vertical longitudinal sectional view along a line 2-2 (a line 2-2 in FIG. 3) in FIG. 5 illustrating the essential part of the vehicle-body lower structure with a side collision sensor according to the first embodiment.
Figure 3:
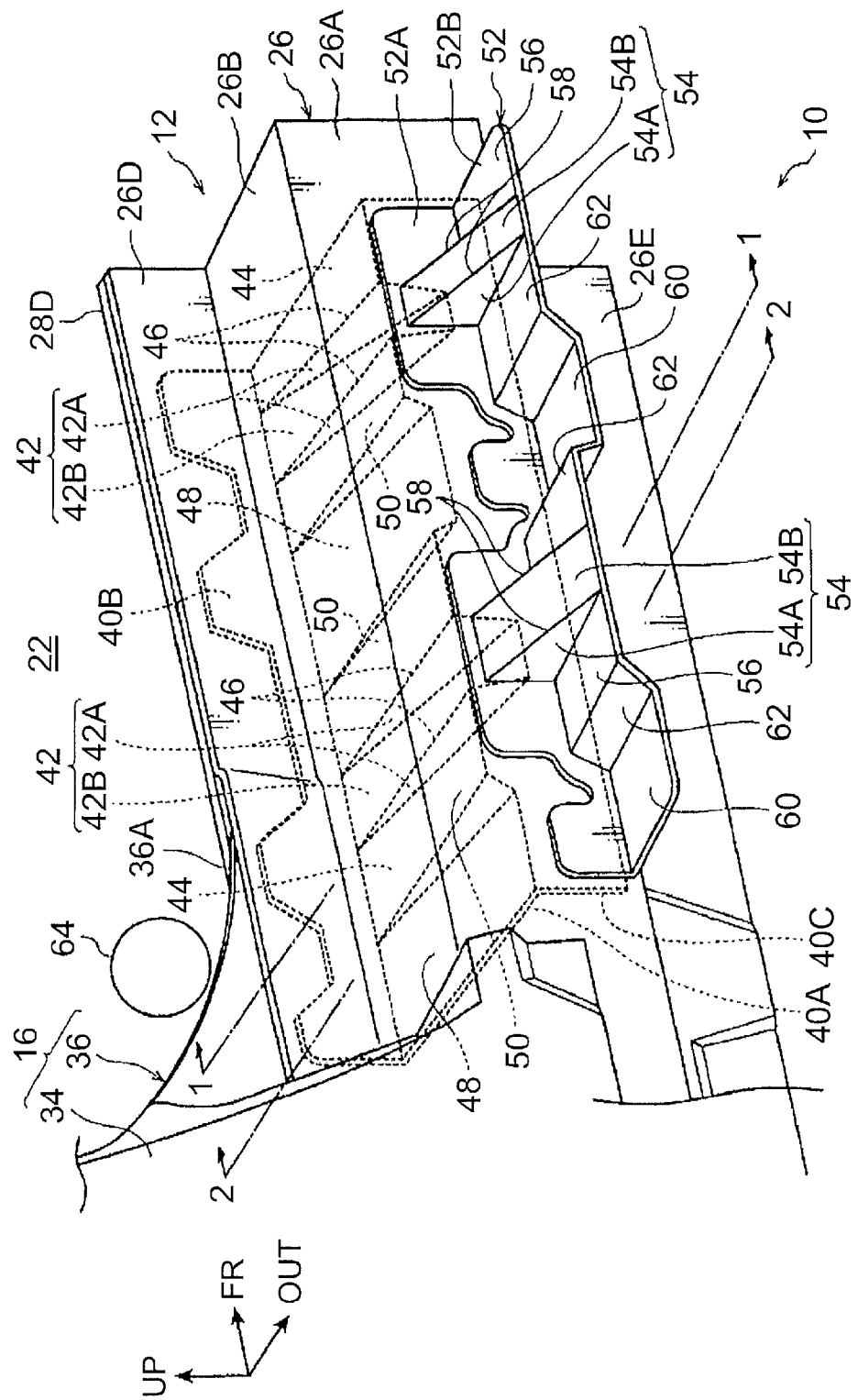
FIG. 3 is a perspective view illustrating a general structure of the vehicle-body lower structure with a side collision sensor according to the first embodiment.

More specifically, as illustrated in FIG. 2, the rocker outer panel 26 is constituted by: a vertical wall portion 26A placed at the outer side in the vehicle width direction so as to extend in a vehicle up and down direction in a longitudinal section view; an upper wall portion 26B bent inwardly in the vehicle width direction from an upper end of the vertical wall portion 26A; a lower wall portion 26C bent inwardly in the vehicle width direction from a lower end of the vertical wall portion 26A; an upper flange 26D bent toward a vehicle upper side from an inner end of the upper wall portion 26B in the vehicle width direction; and a lower flange 26E bent toward a vehicle lower side from an inner end of the lower wall portion 26C in the vehicle width direction. The rocker outer panel 26 is placed so that an open side faces the inner side in the vehicle width direction.

The rocker inner panel 28 is configured in the same manner as the rocker outer panel 26. That is, the rocker inner panel 28 is constituted by: a vertical wall portion 28A placed at the inner side in the vehicle width direction so as to extend in the vehicle up and down direction in a longitudinal sectional view; an upper wall portion 28B bent outwardly in the vehicle width direction from an upper end of the vertical wall portion 28A; a lower wall portion 28C bent outwardly in the vehicle width direction from a lower end of the vertical wall portion 28A; an upper flange 28D bent toward the vehicle upper side from an outer end of the upper wall portion 28B in the vehicle width direction; and a lower flange 28E bent toward the vehicle lower side from an outer end of the lower wall portion 26C in the vehicle width direction. The rocker inner panel 28 is placed so that an open side faces the outer side in the vehicle width direction. Note that an outer end 32A of a floor panel 32 in the vehicle width direction is spot-welded to the upper wall portion 28B of the rocker inner panel 28.

Figure 1:
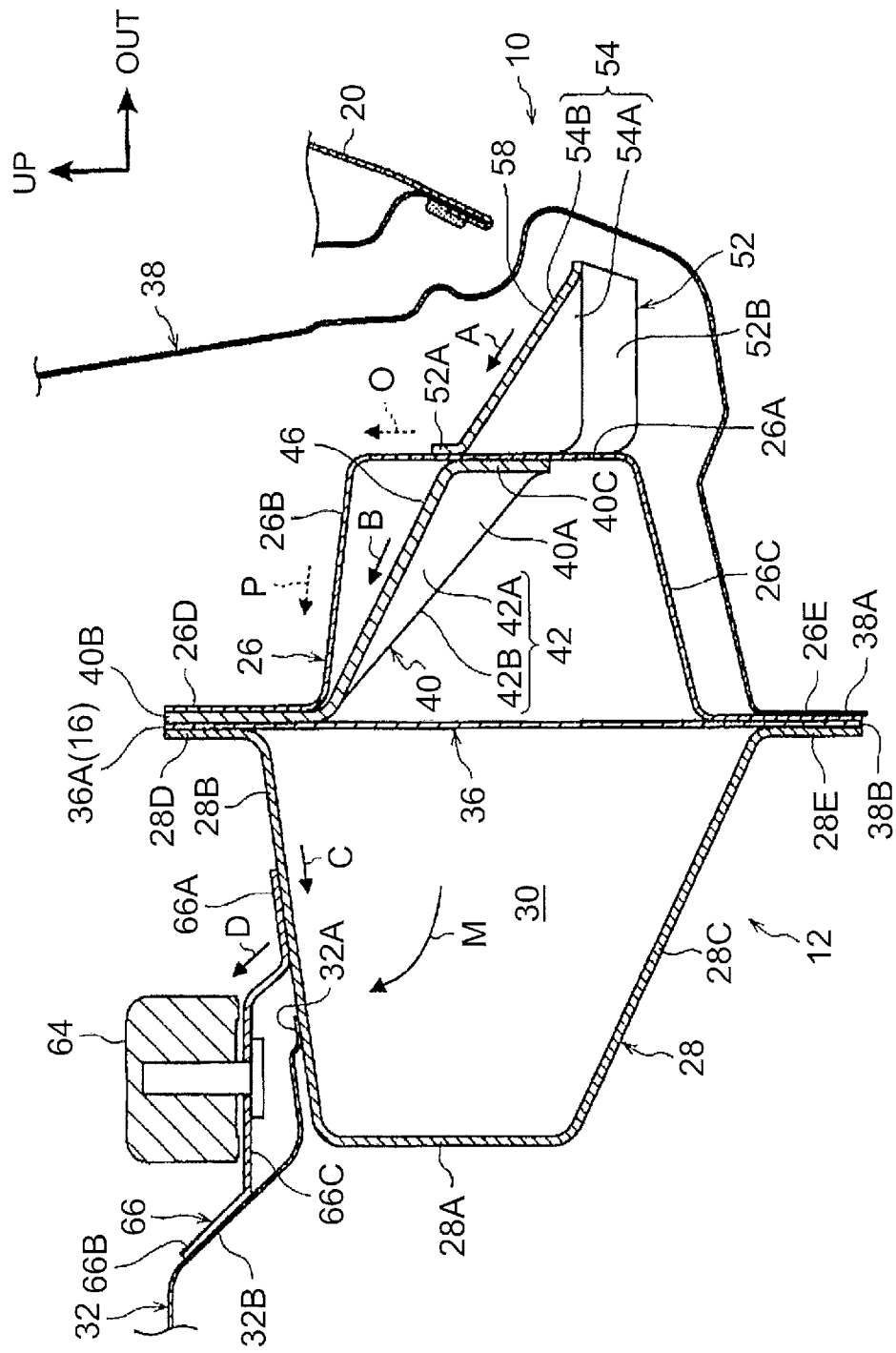
FIG. 1 is an enlarged vertical longitudinal sectional view along a line 1-1 (a line 1-1 in FIG. 3) in FIG. 5 illustrating an essential part of a vehicle-body lower structure with a side collision sensor according to a first embodiment.
Figure 4:
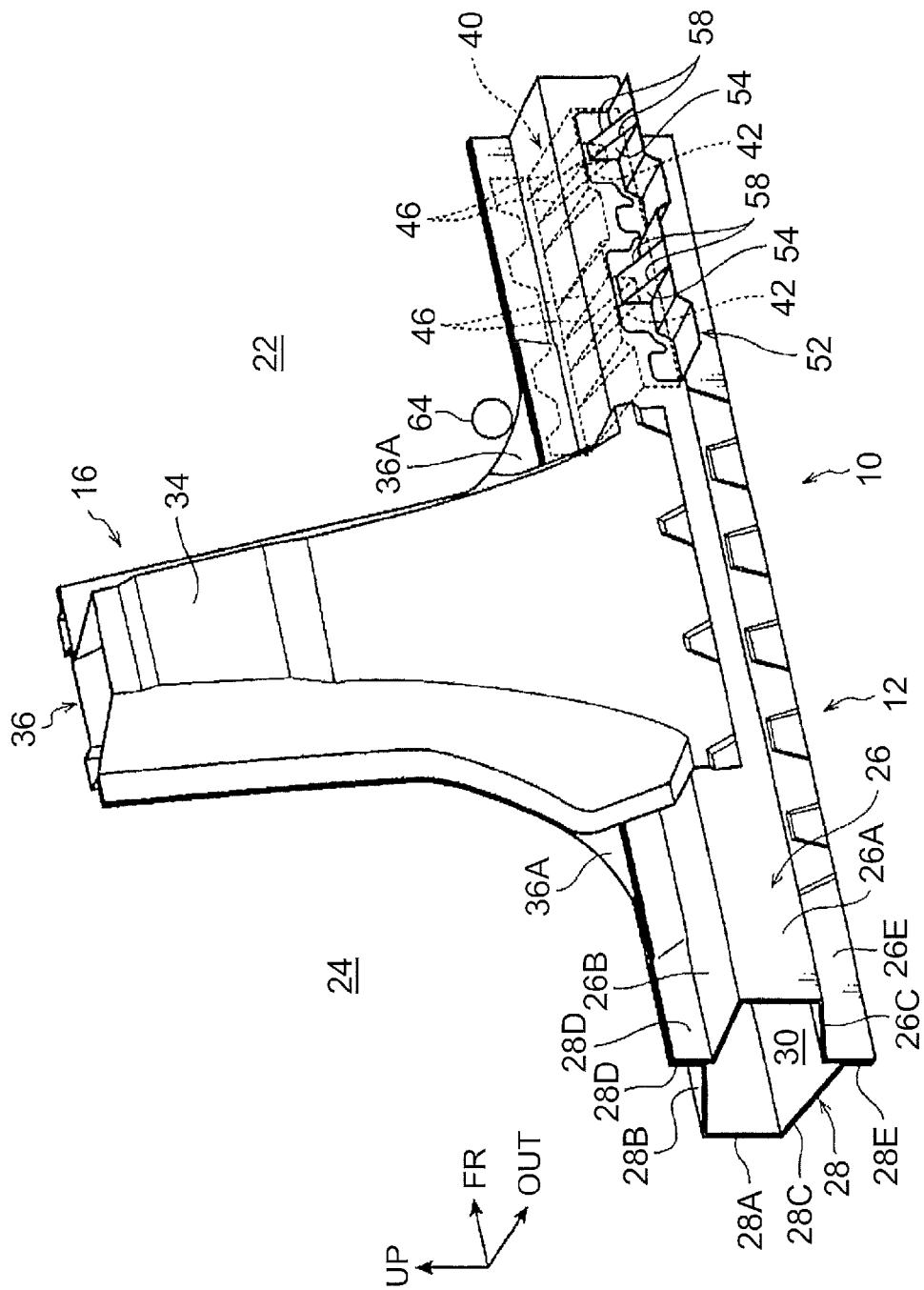
FIG. 4 is an enlarged perspective view mainly illustrating, in an enlarged manner, a first load transmission member and a second load transmission member illustrated in FIG. 3.

As illustrated in FIGS. 1 and 4, the center pillar 16 has a closed-section structure constituted by a center pillar outer panel 34 placed at the outer side in the vehicle width direction and having a hat-shaped plane section, and a center pillar inner panel 36 placed at an inner side of the center pillar outer panel 34 in the vehicle width direction and having a generally linear plane section extending in the vehicle front-rear direction. A lower part of the center pillar outer panel 34 is formed in a skirt shape in a vehicle side view, and is spot-welded to the upper wall portion 26B and the vertical wall portion 26A of the rocker outer panel 26. Further, a lower part of the center pillar inner panel 36 is also formed in a skirt shape in a vehicle side view, and is placed so as to cross the closed section 30 of the rocker 12 in the vehicle up and down direction. In a state where an upper edge 36A of a lower part of the center pillar inner panel 36 is sandwiched between the upper flange 26D of the rocker outer panel 26 and the upper flange 28D of the rocker inner panel 28, the upper edge 36A is joined to the upper flanges 26D, 28D by spot welding. In a state where a lower edge 36B of the lower part of the center pillar inner panel 36 is sandwiched between the lower flange 26E of the rocker outer panel 26 and the lower flange 28E of the rocker inner panel 28, the lower edge 36B is joined to the lower flange 26E of the rocker outer panel 26 and a lower flange 38A of a side outer panel 38 by spot welding. Note that the lower flange 28E of the rocker inner panel 28 is joined, by spot welding, to the lower flange 26E of the rocker outer panel 26 and the lower flange 38A of the side outer panel 38 at places different from the above.

Further, as illustrated in FIGS. 1 and 2, the side outer panel 38 constituting a design surface of a vehicle-body side portion is placed outside the rocker outer panel 26 and the center pillar outer panel 34 in the vehicle width direction.

Here, as illustrated in FIGS. 1 to 4, a first load transmission member (share plate) 40 made of metal is disposed inside the closed section 30 of the rocker 12 so as to partition the closed section 30 longitudinally. The first load transmission member 40 is set at a predetermined position of the rocker 12 in its longitudinal direction (within a range from a head position of a sitting occupant at a seat slide forefront position of a front seat (not shown) to the head position of the sitting occupant at a seat slide last end position, in a vehicle plan view).

When viewed from the vehicle front side, the first load transmission member 40 is formed generally in a lateral Z-shape, and includes a body portion 40A extending generally in the vehicle width direction, a first joining portion 40B bent from an inner end of the body portion 40A in the vehicle width direction toward the vehicle upper side, and a second joining portion 40C bent from an outer end of the body portion 40A in the vehicle width direction toward the vehicle lower side. The first joining portion 40B is joined to the upper flange 26D of the rocker outer panel 26 by spot welding in advance. Further, the second joining portion 40C is joined to an intermediate part, in a height direction, of the vertical wall portion 26A of the rocker outer panel 26 by spot welding in advance. That is, the first load transmission member 40 is attached to an upper part of an inner side of the rocker outer panel 26 in advance. Further, the body portion 40A is placed at the vehicle lower side relative to the upper wall portion 26B of the rocker outer panel 26 in a distanced manner, and has an inclined wall that is steeper than the upper wall portion 26B. When a state where the first load transmission member 40 is joined to the rocker outer panel 26 is viewed from the vehicle front side, the upper wall portion 26B and the vertical wall portion 26A of the rocker outer panel 26, and the body portion 40A of the first load transmission member 40 form a generally right angled triangle with the body portion 40A being assumed as a hypotenuse.

Further, a first ribbed portion 42 of which a longitudinal direction is along the vehicle width direction is formed in each of a front part and a rear part, in the vehicle front-rear direction, of the body portion 40A of the first load transmission member 40. The first ribbed portion 42 is formed in a slope shape that linearly descends on the body portion 40A toward the outer side in the vehicle width direction from a bottom end of the first joining portion 40B as an initial point to the second joining portion 40C as an end point. That is, the first ribbed portion 42 is formed as a recessed ribbed portion constituted by: paired front and rear side walls 42A having a right angled triangular shape when viewed from the vehicle front side such that the side walls 42A bend at a right angle from general portions 44 of the body portion 40A toward the vehicle lower side; and a bottom wall 42B connecting lower ends of the side walls 42A so as to form a rectangular shape in a plan view. Further, boundary portions (bent portions) between the paired front and rear side walls 42A and respective general portions 44 are first edge lines 46 extending in the vehicle width direction. Note that shallow recessed ribbed portions 48 are formed in a front end and an intermediate part, in the vehicle front-rear direction, of the body portion 40A of the first load transmission member 40. Hereby, general portions 44 placed at both sides of the first ribbed portion 42 in the vehicle front-rear direction serve as relatively projecting ribbed portions 50 to reinforce both sides of the first ribbed portion 42 in the vehicle front-rear direction. Note that a general portion 44 formed in a rear part of the body portion 40A in the vehicle front-rear direction and placed at the vehicle rear side relative to the first ribbed portion 42 has a short length in the vehicle front-rear direction, so the general portion 44 is not formed as a ribbed portion.

A second load transmission member 52 made of metal is disposed at a position overlapping with the first load transmission member 40 in a vehicle side view on an outer surface, in the vehicle width direction, of the vertical wall portion 26A of the rocker outer panel 26. The second load transmission member 52 is formed generally in an L-shape when viewed from the vehicle front side, and includes a mounting portion 52A extending in the vehicle up and down direction, and an overhanging portion 52B that overhangs outwardly in the vehicle width direction from a lower end of the mounting portion 52A. The mounting portion 52A abuts with the vertical wall portion 26A of the rocker outer panel 26, and is joined thereto by spot welding together with the second joining portion 40C of the first load transmission member 40 in a state where they overlap with each other.

Second ribbed portions 54 of which a longitudinal direction is along the vehicle width direction are formed in a front part and a rear part, in the vehicle front-rear direction, of the overhanging portion 52B of the second load transmission member 52. The second ribbed portion 54 is formed in a slope shape linearly descending on the overhanging portion 52B toward the outer side in the vehicle width direction from the mounting portion 52A as an initial point to a tip end of the overhanging portion 52B as an end point. That is, the second ribbed portion 54 is formed as a projecting ribbed portion constituted by: paired front and rear side walls 54A having a right angled triangular shape when viewed from the vehicle front side such that the side walls 54A bend at a right angle from general portions 56 of the overhanging portion 52B toward the vehicle upper side; and a top wall 54B connecting upper ends of the side walls 54A and having a rectangular shape in a plan view. Further, boundary portions (bent portions) between the paired front and rear side walls 54A and respective general portions 56 are second edge lines 58 extending in the vehicle width direction. The second edge line 58 is placed on an extended line of the first edge line 46 of the first ribbed portion 42. That is, the second edge line 58 extends in the vehicle width direction along an extended direction of the first edge line 46.

Note that shallow recessed ribbed portions 60 are formed in a front end and an intermediate part, in the vehicle front-rear direction, of the overhanging portion 52B of the second load transmission member 52. Hereby, general portions 56 placed at both sides of the second ribbed portion 54 in the vehicle front-rear direction serve as relatively projecting ribbed portions 62 to reinforce both sides of the second ribbed portion 54 in the vehicle front-rear direction. Note that a general portion 56 formed in a rear part of the overhanging portion 52B in the vehicle front-rear direction and placed at the vehicle rear side relative to the second ribbed portion 54 has a short length in the vehicle front-rear direction, so the general portion 56 is not formed as a ribbed portion.

As illustrated in FIG. 1, a side collision detection sensor 64, which is an acceleration sensor, is disposed at a predetermined position (near a position intersecting with the upper edge 36A of the lower part of the center pillar inner panel 36) of the rocker inner panel 28. Note that, in FIGS. 3 and 4, the side collision detection sensor 64 is simply illustrated as a circle. More specifically, the side collision detection sensor 64 is attached to the rocker inner panel 28 and the floor panel 32 via a metal mounting bracket 66. When viewed from the vehicle front side, the mounting bracket 66 is formed generally in a Z-shape, and includes an intermediate part 66C placed horizontally, one end 66A extended outwardly in the vehicle width direction from the intermediate part 66C via a step, and the other end 66B extended diagonally upward on an inner side of the intermediate part 66C in the vehicle width direction. The one end 66A is fixed to the upper wall portion 28B of the rocker inner panel 28 by spot welding, and the other end 66B is fixed to a stepped portion 32B formed in the outer end 32A of the floor panel 32 in the vehicle width direction by spot welding. Hereby, the mounting bracket 66 is provided over the upper wall portion 28B of the rocker inner panel 28 and an outer side (the stepped portion 32B), in the vehicle width direction, of a general surface of the floor panel 32, so as to be fixed to both of them. The side collision detection sensor 64 is fixed to the intermediate part 66C of the mounting bracket 66.

Further, the side collision detection sensor 64 is arranged side by side, in the vehicle width direction, with the first edge line 46 of the first ribbed portion 42 placed at a front side out of the paired front and rear first ribbed portions 42 formed in the body portion 40A of the first load transmission member 40 in a vehicle plan view.

Operation and Effect of Present Embodiment

An operation and an effect of the present embodiment are described below.

At the time of a side collision with a collision object such as a pole, that is, when the front door opening 22 collides with the collision object at a position closer to the center pillar 16, a collision load at this time is input into that overhanging portion 52B of the second load transmission member 52 which overhangs outwardly in the vehicle width direction from the rocker outer panel 26. Since the paired front and rear second ribbed portions 54 of which the longitudinal direction is along the vehicle width direction are formed in the overhanging portion 52B, the collision load is mainly transmitted to the vertical wall portion 26A of the rocker outer panel 26 through the second edge lines 58 of the second ribbed portions 54 (a load transmission passage at this time is indicated by an arrow A in FIG. 1).

Here, the first load transmission member 40 is disposed inside the closed section 30 of the rocker 12 so as to partition the closed section 30 longitudinally. The first joining portion 40B of the first load transmission member 40 is joined in a state where the first joining portion 40B is sandwiched between the upper flange 26D of the rocker outer panel 26 and the upper flange 28D of the rocker inner panel 28, and the second joining portion 40C is joined to the intermediate part, in the height direction, of the vertical wall portion 26A of the rocker outer panel 26. Further, the first ribbed portions 42 of which the longitudinal direction is along the vehicle width direction are formed in the body portion 40A, and the second edge lines 58 are placed on the extended direction of the first edge lines 46. In the above configuration, the collision load input into the vertical wall portion 26A of the rocker outer panel 26 is directly transmitted to the upper flange 28D of the rocker inner panel 28 by a shortest distance through the first edge lines 46 of the first ribbed portions 42 formed in the first load transmission member 40 (a load transmission passage at this time is indicated by an arrow B in FIG. 1). Subsequently, the collision load transmitted to an edge line of a bottom of the upper flange 28D of the rocker inner panel 28 passes through the upper wall portion 28B of the rocker inner panel 28 (a load transmission passage at this time is indicated by an arrow C in FIG. 1), and then, the collision load is transmitted to the mounting bracket 66 of which the one end 66A is fixed to the upper wall portion 28B, and further to the side collision detection sensor 64 (a load transmission passage at this time is indicated by an arrow D in FIG. 1). As a result, sensing by the side collision detection sensor 64 is performed earlier. That is, according to the present embodiment, it is possible to attain early sensing by improving a body structure.

Note that, in addition to conventional load transmission passages (load transmission passages at this time are indicated by arrows O, P in FIG. 1), load transmission passages (arrows A→B→C→D in FIG. 1) through the first load transmission member 40 are added as the load transmission passage from the rocker outer panel 26 to the rocker inner panel 28, which also contributes to early sensing. Further, by applying the present structure, the effect of early sensing can be expected on an ECU side disposed in a floor tunnel.

Further, the first joining portion 40B of the first load transmission member 40 is joined to the upper flange 26D of the rocker outer panel 26 in advance, and the second joining portion 40C is joined to the vertical wall portion 26A of the rocker outer panel 26 in advance. Accordingly, the first load transmission member 40 is sub-assembled to a rocker-outer-panel-26 side in advance. This makes it possible to easily perform assembly of the rocker 12. As a result, according to the present embodiment, it is possible to successfully maintain productivity of the vehicle-body lower portion 10, eventually, a whole vehicle body.

Further, the first load transmission member 40 is provided with a plurality of first ribbed portions 42 having the first edge lines 46 extending in the vehicle width direction between the first joining portion 40B and the second joining portion 40C. Accordingly, rigidity to a load input in the vehicle width direction is increased. In view of this, a collision load input into the second joining portion 40C from the vertical wall portion 26A of the rocker outer panel 26 is efficiently transmitted to the first joining portion 40B through the first edge lines 46 formed in the first ribbed portions 42. As a result, according to the present embodiment, it is possible to further improve load transmission performance of the side collision detection sensor 64.

Further, the first edge lines 46 and the side collision detection sensor 64 are placed side by side in the vehicle width direction in a vehicle plan view, so that the load transmission passage is shortened in the vehicle plan view. Consequently, according to the present embodiment, it is possible to further shorten a detection time of the side collision detection sensor 64.

Further, the mounting bracket 66 is fixed in a state where the mounting bracket 66 is provided over the upper wall portion 28B of the rocker inner panel 28 and the floor panel 32, and the side collision detection sensor 64 is attached to the mounting bracket 66. In view of this, when a collision load is input into the vertical wall portion 26A of the rocker outer panel 26 at the time of a side collision, a rotation moment M (see FIG. 1) toward a direction where the first load transmission member 40 pivots inwardly in the vehicle width direction with the first joining portion 40B being taken as a rotation center is applied to the first load transmission member 40. Accordingly, the upper wall portion 28B of the rocker inner panel 28 is pushed up to the vehicle upper side, so that the side collision detection sensor 64 can detect a side collision state more quickly. As a result, according to the present embodiment, it is possible to advance a detection time particularly in a case where the side collision detection sensor 64 is an acceleration sensor.

Further, the second load transmission member 52 is provided at a position overlapping with the first load transmission member 40 in a vehicle side view, on the outer surface, in the vehicle width direction, of the vertical wall portion 26A of the rocker outer panel 26 so that the second load transmission member 52 overhangs outwardly in the vehicle width direction. Accordingly, a collision load at the time of a side collision is input into the second load transmission member 52 first. That is, at an earlier time than a time when the collision load is input into the first load transmission member 40, the collision load is input into the second load transmission member 52. The collision load input into the second load transmission member 52 is then transmitted to the first load transmission member 40 from the vertical wall portion 26A of the rocker outer panel 26. After that, the collision load is transmitted to the rocker inner panel 28 so as to be input into the side collision detection sensor 64. As a result, according to the present embodiment, it is possible to further attain early sensing.

Further, the second edge lines 58 of the second ribbed portions 54 formed in the second load transmission member 52 are formed along the extended direction of the first edge lines 46 of the first ribbed portions 42 formed in the first load transmission member 40. This allows the collision load to be transmitted between the second edge lines 58 and the first edge lines 46, which both have high load transmission performance. Accordingly, a transmission loss of the load can be reduced. As a result, according to the present embodiment, it is possible to effectively improve the load transmission performance of the side collision detection sensor 64 together with the first load transmission member 40.

Second Embodiment

Figure 6:
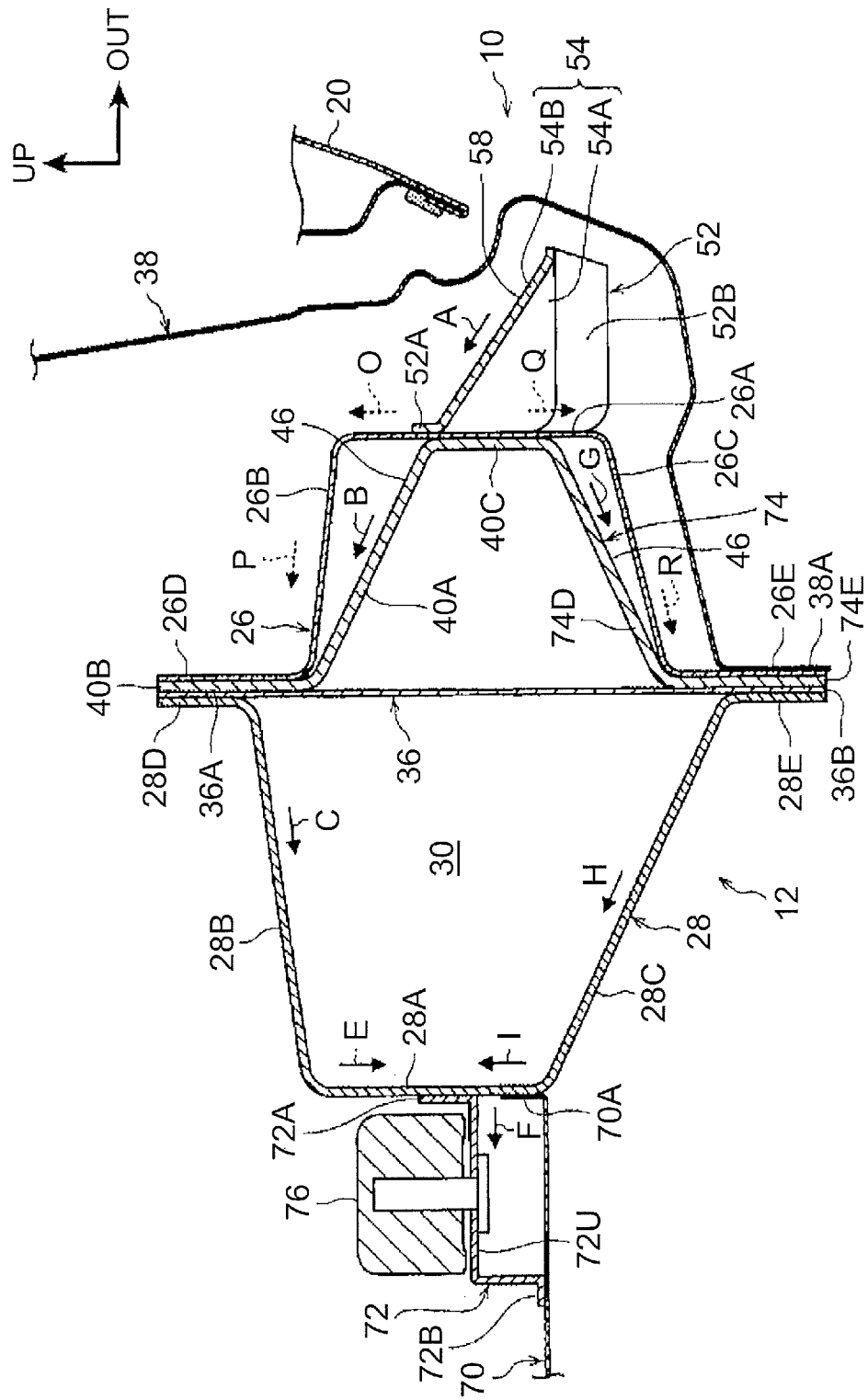
FIG. 6 is an enlarged vertical longitudinal sectional view illustrating an essential part of a vehicle-body lower structure with a side collision sensor according to a second embodiment, and corresponds to FIG. 1.

With reference to FIG. 6, the following describes the second embodiment of the vehicle-body lower structure with a side collision sensor according to the present invention. Note that the same constituent as in the first embodiment has the same reference sign as in the first embodiment, and description thereof is omitted.

As illustrated in FIG. 6, in the second embodiment, an outer end 70A of a floor panel 70 in the vehicle width direction is spot-welded to a vertical wall portion 28A of a rocker inner panel 28. A mounting bracket 72 is disposed over the floor panel 70 and the vertical wall portion 28A of the rocker inner panel 28. More specifically, the mounting bracket 72 has generally the same structure as the mounting bracket 66 described in the first embodiment, and includes one end 72A, the other end 72B, and an intermediate part 72C. The one end 72A is fixed to the vertical wall portion 28A of the rocker inner panel 28 by spot welding. Further, the other end 72B is fixed to an outer surface, in the vehicle width direction, of a general surface of a floor panel 70 (a part close to an end 70A) by spot welding. A side collision detection sensor 76 is attached to the intermediate part 72C of the mounting bracket 72.

As corresponding to this, a first load transmission member 74 has a hat shape that is opened inwardly in the vehicle width direction. That is, the first load transmission member 74 includes a body lower portion 74D, and a third joining portion 74E, in addition to a first joining portion 40B, a body portion 40A, and a second joining portion 40C having the same configuration as in the first embodiment. Note that, in the following description, the body portion 40A of the first load transmission member 74 is referred to as the "body upper portion 40A" from the viewpoint that the body portion 40A forms a pair with the body lower portion 74D. The body lower portion 74D is placed at a vehicle lower side relative to the body upper portion 40A. Further, an inclination direction of the body lower portion 74D is a direction reverse to an inclination direction of the body upper portion 40A. Further, at a position illustrated in FIG. 6, in a state where the third joining portion 74E is sandwiched between a lower edge 36B of a lower part of a center pillar inner panel 36 and a lower flange 26E of a rocker outer panel 26, the third joining portion 74E is joined thereto together with a lower flange 38A of a side outer panel 38.

Operation and Effect of Present Embodiment

According to the above configuration, the first load transmission member 74 includes the body lower portion 74D and the third joining portion 74E in addition to the first joining portion 40B, the body upper portion 40A, and the second joining portion 40C. Further, the third joining portion 74E is joined in a state where the third joining portion 74E is sandwiched between the lower flange 28E of the rocker inner panel 28 and the lower flange 26E of the rocker outer panel 26. In view of this, at the time of a side collision with a collision object such as a pole, a collision load input in an overhanging portion 52B of a second load transmission member 52 is mainly transmitted to the vertical wall portion 26A of the rocker outer panel 26 through second edge lines 58 of second ribbed portions 54 (a load transmission passage at this time is indicated by an arrow A in FIG. 6). After that, the collision load is transmitted to the body upper portion 40A of the first load transmission member 40 (a load transmission passage at this time is indicated by an arrow B in FIG. 6). The load transmitted to a body-upper-portion- 40A side is transmitted to an upper-wall-portion-28B side of the rocker inner panel 28 via the first joining portion 40B (a load transmission passage at this time is indicated by an arrow C in FIG. 6). After that, the load is transmitted to the side collision detection sensor 76 (a load transmission passage at this time is indicated by an arrow F in FIG. 6) through the vertical wall portion 28A (a load transmission passage at this time is indicated by an arrow E in FIG. 6).

In the meantime, a load input from a recessed ribbed portion 60 side and a projecting ribbed portion 62 side formed in front and rear parts of the second ribbed portion 54 out of the collision load input into the overhanging portion 52B of the second load transmission member 52 is transmitted from the vertical wall portion 26A of the rocker outer panel 26 to the body lower portion 74D (a load transmission passage at this time is indicated by an arrow G in FIG. 6). Then, the load is transmitted to a lower-wall-portion-28C side of the rocker inner panel 28 via the third joining portion 74E (a load transmission passage at this time is indicated by an arrow H in FIG. 6). After that, the load is transmitted to the side collision detection sensor 76 (a load transmission passage at this time is indicated by the arrow F in FIG. 6) through the vertical wall portion 28A (a load transmission passage at this time is indicated by an arrow I in FIG. 6).

Thus, even in the present embodiment, the collision load at the time of the side collision is directly applied, by a shortest distance, to the upper wall portion 28B and the lower wall portion 28C of the rocker inner panel 28 through the body upper portion 40A and the body lower portion 74D of the first load transmission member 74, so that the collision load can be finally transmitted to the side collision detection sensor 76. In view of this, according to the present embodiment, sensing by the side collision detection sensor 76 is performed earlier than in a case of a conventional structure. That is, even according to the present embodiment, it is possible to attain early sensing by improving a body structure.

Note that, in addition to conventional load transmission passages (load transmission passages at this time are indicated by arrows O, P, and arrows Q, R in FIG. 6), load transmission passages (arrows A→B→C→E→F and arrows A→G→H→I→F in FIG. 6) through the first load transmission member 74 are added as the load transmission passage from the rocker outer panel 26 to the rocker inner panel 28, which also contributes to early sensing.

Further, the first load transmission member 74 has a section formed in a hat shape so that the first joining portion 40B and the third joining portion 74E are joined to an upper end and a lower end of the rocker 12. Accordingly, unlike the first embodiment, a rotation moment M with the first joining portion 40B being taken as a rotation center is not applied, and the whole first load transmission member 74 is displaced so as to move in parallel toward an inner side in the vehicle width direction. As a result, a disposition place of the side collision detection sensor 76 is not limited. In view of this, according to the present embodiment, a degree of freedom in placement of the side collision detection sensor 76 can be increased, so that the side collision detection sensor 76 can be applied to more types of vehicles.

Further, since the third joining portion 74E of the first load transmission member 74 is joined to the lower flange 26E of the rocker outer panel 26 in advance, the first load transmission member 74 is sub-assembled to a rocker-outer-panel-26 side in advance. This makes it possible to easily perform assembly of the rocker 12. As a result, according to the present embodiment, it is possible to successfully maintain productivity of the vehicle-body lower portion 10, eventually, a whole vehicle body.

Further, the side collision detection sensor 76 is attached to the vertical wall portion 28A placed at the inner side, in the vehicle width direction, of the rocker inner panel 28 via the mounting bracket 72. Accordingly, the side collision detection sensor 76 is more suitable for the first load transmission member 74 having a generally hat-shaped section than for the first load transmission member 40 having a generally Z-shaped section and used in the first embodiment. In other words, in a case where the side collision detection sensor 76 is placed so as not to be biased on either side in the vehicle up and down direction relative to a sectional shape of the rocker inner panel 28 (in a case where the side collision detection sensor 76 is placed near an intermediate part, in the vehicle up and down direction, of the rocker inner panel 28), it is effective to directly transmit a collision load at the time of a side collision, to both the upper wall portion 28B and the lower wall portion 28C of the rocker inner panel 28 by a shortest passage, equally. Further, contrastively, in a case where the side collision detection sensor 76 is disposed on the vertical wall portion 28A of the rocker inner panel 28, the load transmission passage becomes longer than in a case where the side collision detection sensor 64 is disposed on the upper-wall-portion-28B side of the rocker inner panel 28. However, in the present embodiment, a collision load is also transmitted to the side collision detection sensor 76 from the lower wall portion 28C of the rocker inner panel 28, so that sensing by the side collision detection sensor 76 is performed quickly. In view of this, according to the present embodiment, particularly in a case where the outer end 70A of the floor panel 70 in the vehicle width direction is joined to the vertical wall portion 28A of the rocker inner panel 28, it is possible to attain early sensing.

Supplementary Description of Embodiments (1) In each of the above embodiments, the first load transmission member 40, 74 and the second load transmission member 52 are set on a front-door-opening-22 side in the rocker 12. However, each of the embodiments is not limited to this, and the first load transmission member and the second load transmission member may be set on a rear-door-opening-24 side in the rocker 12, or the first load transmission member and the second load transmission member may be set both on the front-door-opening-22 side and on the rear-door-opening-24 side.

(2) In each of the above embodiments, the second load transmission member 52 is set in addition to the first load transmission member 40, 74. However, the second load transmission member may not be provided necessarily, and may be omitted. Further, the second load transmission member 52 is made of metal. However, each of the above embodiments is not limited to this, and the second load transmission member may be made of resin.

(3) In each of the above embodiments, a plurality of first ribbed portions 42 is set in the first load transmission member 40, 74, and a plurality of second ribbed portions 54 is also set in the second load transmission member 52. However, each of the embodiments is not limited to this, and one ribbed portion may be provided, or three or more ribbed portions may be provided. At this time, the number of edge lines included in one ribbed portion may be one, or three or more. For example, if a sectional shape of a ribbed portion is a triangular shape, the number of edge lines is one, and the ribbed portion may have such a ribbed portion shape.

(4) In each of the above embodiments, the side collision detection sensor 64, 76 is attached to the rocker inner panel 28 via the mounting bracket 66, 72 fixed in a state where the mounting bracket 66, 72 is provided over the rocker inner panel 28 and the floor panel 32, 70. However, each of the embodiments is not limited to this, and in a case where a space to provide the side collision detection sensor can be secured, the side collision detection sensor may be directly attached to the upper wall portion, the lower wall portion, or the vertical wall portion of the rocker inner panel. Further, in a case where a longitudinal end of a floor cross member having a hat-shaped longitudinal section and having a closed-section structure by being joined to a lower surface of the floor panel is joined to the rocker inner panel 28, the side collision detection sensor may be set near the longitudinal end of the floor cross member. Further, the side collision detection sensor may be set in a lower part of a pillar such as the center pillar.

(5) In each of the above embodiments, the first load transmission member 40 is attached to the upper part of the inner side of the rocker outer panel 26 in advance. However, each of the embodiments is not limited to this, and the first load transmission member 40 may be joined to the upper part of the inner side of the rocker outer panel 26 in an assembly step of the rocker. Further, it is more effective to join together (attaching together) the first joining portion 40B of the first load transmission member 40 to the upper flange 26D of the rocker outer panel 26 and to the upper flange 28D of the rocker inner panel 28.

The invention claimed is:

1. A vehicle-body lower structure with a side collision sensor comprising:
    a rocker placed at an outer side of a vehicle-body lower portion in a vehicle width direction so as to extend along a vehicle front-rear direction, the rocker having a closed-section structure constituted by a rocker outer panel and a rocker inner panel such that an upper flange formed in an upper part of the rocker outer panel is joined to an upper flange formed in an upper part of the rocker inner panel;
    a side collision detection sensor attached to the rocker inner panel or a member joined to the rocker inner panel, or a lower part of a pillar provided in a standing manner from the rocker, so as to detect a side collision based on an acceleration; and
    a first load transmission member placed in a closed section of the rocker so as to partition the closed section longitudinally, the first load transmission member being configured such that a first joining portion of the first load transmission member is joined in a state where the first joining portion is sandwiched between the upper flange of the rocker inner panel or the lower part of the pillar and the upper flange of the rocker outer panel and a second joining portion of the first load transmission member is joined to a vertical wall portion placed at an outer side of the rocker outer panel in the vehicle width direction, the vertical wall portion extending in a vehicle up and down direction.

2. The vehicle-body lower structure according to claim 1, wherein
    the first joining portion is joined to the upper flange of the rocker outer panel in advance, and the second joining portion is joined to the vertical wall portion of the rocker outer panel in advance.

3. The vehicle-body lower structure according to claim 1, wherein
    the first load transmission member includes one or more first ribbed portions formed between the first joining portion and the second joining portion and having a first edge line extending in the vehicle width direction.

4. The vehicle-body lower structure according to claim 3, wherein
    the first edge line and the side collision detection sensor are arranged side by side in the vehicle width direction in a vehicle plan view.

5. The vehicle-body lower structure according to claim 1, wherein
    the side collision detection sensor is attached to a mounting bracket fixed in a state where the mounting bracket is provided over an upper wall portion of the rocker inner panel and a floor panel having an end joined to the upper wall portion.

6. The vehicle-body lower structure according to claim 1, wherein
    a second load transmission member overhanging outwardly in the vehicle width direction is provided at a position overlapping with the first load transmission member in a vehicle side view on an outer surface, in the vehicle width direction, of the vertical wall portion of the rocker outer panel.

7. The vehicle-body lower structure according to claim 6, wherein:
    the first load transmission member includes one or more first ribbed portions formed between the first joining portion and the second joining portion and having a first edge line extending in the vehicle width direction; and
    the second load transmission member includes one or more second ribbed portions having a second edge line extending in the vehicle width direction along an extended direction of the first edge line.

8. The vehicle-body lower structure according to claim 1, wherein:
    respective lower flanges are formed in a lower part of the rocker outer panel and a lower part of the rocker inner panel and the respective lower flanges are joined to each other; and
    the first load transmission member includes a third joining portion joined in a state where the third joining portion is sandwiched between the lower flange of the rocker inner panel or the lower part of the pillar and the lower flange of the rocker outer panel.

9. The vehicle-body lower structure according to claim 8, wherein
    the third joining portion is joined to the lower flange of the rocker outer panel in advance.

10. The vehicle-body lower structure according to claim 8, wherein
    the side collision detection sensor is attached to a vertical wall portion placed at an inner side of the rocker inner panel in the vehicle width direction.

* * * * *